US010402186B2

(12) United States Patent
Duchan

(10) Patent No.: US 10,402,186 B2
(45) Date of Patent: Sep. 3, 2019

(54) REMOTE UPDATE OF A PORTABLE STORAGE DEVICE

(71) Applicant: Gimso Mobile Ltd., RaAnana (IL)

(72) Inventor: Eran Duchan, ShaAr Hefer (IL)

(73) Assignee: Gimso Mobile Ltd., RaAnana (IL)

( * ) Notice: Subject to any disclaimer, the term of this patent is extended or adjusted under 35 U.S.C. 154(b) by 0 days.

(21) Appl. No.: 14/892,009

(22) PCT Filed: May 21, 2014

(86) PCT No.: PCT/IL2014/050446
§ 371 (c)(1),
(2) Date: Nov. 18, 2015

(87) PCT Pub. No.: WO2014/188421
PCT Pub. Date: Nov. 27, 2014

(65) Prior Publication Data
US 2016/0092200 A1  Mar. 31, 2016

Related U.S. Application Data

(60) Provisional application No. 61/826,056, filed on May 22, 2013.

(51) Int. Cl.
*G06F 8/65* (2018.01)
*G06Q 20/34* (2012.01)
*H04L 29/08* (2006.01)

(52) U.S. Cl.
CPC .......... *G06F 8/65* (2013.01); *G06Q 20/3415* (2013.01); *H04L 67/1097* (2013.01)

(58) Field of Classification Search
CPC .... H04L 67/1097; G06F 8/65; G06Q 20/3415
See application file for complete search history.

(56) References Cited

U.S. PATENT DOCUMENTS

| 6,603,982 B1 * | 8/2003 | Muller ................. H04W 8/205 455/558 |
| 2005/0077363 A1 | 4/2005 | Seo |
| 2006/0095598 A1 | 5/2006 | Prevost et al. |

(Continued)

FOREIGN PATENT DOCUMENTS

| EP | 1264461 | 12/2002 |
| WO | 0025278 | 5/2000 |

*Primary Examiner* — Wei Y Zhen
*Assistant Examiner* — Amir Soltanzadeh
(74) *Attorney, Agent, or Firm* — GableGotwals

(57) ABSTRACT

This invention relates to a method for remotely updating a portable storage device, comprising the steps of: a) delaying an access to an identification card interface of a portable storage device communicating with a hosting device by acknowledging with one or more consecutive no operation procedure byte to commands issued by the hosting device, the portable storage device being installed in an identification card socket; b) updating the portable storage device with new data through an updating device connected to an update interface of the portable storage device during the access of said hosting device to the identification card interface; and c) providing the new data to the hosting device through the identification card interface after the new data is updated in the portable storage device.

11 Claims, 7 Drawing Sheets

(56) References Cited

U.S. PATENT DOCUMENTS

| | | | |
|---|---|---|---|
| 2007/0012762 A1* | 1/2007 | Van Overbeke | H01Q 1/22 |
| | | | 235/380 |
| 2009/0137276 A1 | 5/2009 | Baldischweiter | |
| 2010/0332855 A1 | 12/2010 | Dolgunov et al. | |
| 2011/0306318 A1* | 12/2011 | Rodgers | H04W 8/183 |
| | | | 455/410 |
| 2012/0275442 A1* | 11/2012 | Malets | H04W 4/16 |
| | | | 370/338 |
| 2014/0342715 A1* | 11/2014 | Gu | G06F 9/455 |
| | | | 455/418 |

* cited by examiner

REMOTE UPDATE OF A PORTABLE STORAGE DEVICE

CROSS-REFERENCE TO RELATED APPLICATIONS

This application is the United States National Phase of Patent Application No. PCT/IL2014/050446 filed 21 May 2014, which claims priority to U. S. Provisional Patent Application No. 61/826,056 filed 22 May 2013, each of which is incorporated herein by reference.

BACKGROUND

The present invention, in some embodiments thereof, relates to remote update of a portable storage device installed in an identification card socket and, more specifically, but not exclusively, to remote update of a portable storage device installed in an identification card socket while prolonging communication with a hosting device.

Identification cards as defined, for example, by the ISO/IEC 7816 specification which is incorporated herein by reference relate to, for example, electronic identification cards and/or authentication cards. Identification cards are widely used for a plurality of applications, for example, financial credit cards, subscriber identification module (SIM) cards and/or identity authentication cards.

The identification cards may be used in a plurality of modes, for example, identity information storage, encryption key storage, data storage and/or event logging. In its most common use, the identification card is pre-loaded with data, which may be retrieved by the hosting device. Other application may require the hosting device to update the contents of the identification card.

Communication between the identification card and the hosting device is performed through a physical layer and transport layer as defined, for example, by the ISO/IEC 7816 specification, which describes the aspects of the communication protocol including, for example, physical characteristics, electrical characteristics, transmission protocols, data organization, data elements, protocol commands and/or encryption aspects.

SUMMARY

According to some embodiments of the present invention, there are provided methods of remotely updating a portable storage device. Remote update of a portable storage device is performed by delaying an access to an identification card interface of the portable storage device communicating with a hosting device while the portable storage device is installed in an identification card socket. Delaying accesses is done by acknowledging with one or more consecutive no operation procedure byte to commands issued by the hosting device. The portable storage device is updated with new data through an updating device connected to an update interface of the portable storage device while delaying the accesses of the hosting device to the identification card interface of the portable storage device. After the new data is updated in the portable storage device, the new data is provided to the hosting device through the identification card interface.

Optionally, the portable storage device acknowledges with at least one consecutive no operation procedure byte accesses made by the hosting device to data which is available in the portable storage device.

Optionally, the portable storage device is emulating a subscriber identification module (SIM) card.

Optionally, the identification card interface complies with the ISO/IEC 7816 specification.

Optionally, the one or more consecutive no operation procedure byte acknowledgement is utilized through a null response as specified by ISO/IEC 7816 specification.

Optionally, further delaying accesses of the hosting device is done by setting operation frequency of the identification card interface to low operation frequency by encoding accordingly a clock rate conversion integer, a baud rate adjustment integer and a maximum supported frequency in an answer to reset (ATR) response to the hosting device.

Optionally, further delaying accesses of the hosting device is done by setting a waiting time (WT) over the identification card interface to high WT value by encoding accordingly a waiting time integer (WI) in an answer to reset (ATR) response to the hosting device.

Optionally, the number of repeats of acknowledgements of no operation procedure bytes on the identification card interface is restricted to the maximum number of no operation procedure byte allowed by the hosting device.

Optionally, further delaying accesses of the hosting device is done by inserting maximum delay time between consecutive data transmissions over the identification card interface when responding to the hosting device.

Optionally, two or more portable storage devices interface the hosting device where only one of the two or more portable storage devices is communicating with the hosting device at any time.

According to some embodiments of the present invention, there is provided a portable storage device. The portable storage device includes a memory component which is used to store data, an identification card interface component which connects to an identification card socket and communicates with a hosting device over an identification card interface to provide the hosting device with the stored data, an update interface component which connects to an updating device and receives new data to be stored in the memory component and a control component which controls the memory component, the identification card interface component and the update interface component. The control component controls the identification card interface component to prolong communication with the hosting device by acknowledging with one or more consecutive a no operation procedure bytes to the hosting device in order to allow the new data to be updated in the memory component.

Optionally, the control component instructs the identification card interface component to acknowledge with one or more consecutive no operation procedure bytes to accesses made by the hosting device to data which is available in the memory component.

Optionally, the portable storage device is emulating a subscriber identification module (SIM) card.

Optionally, the identification card interface complies with the ISO/IEC 7816 specification.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

Figure 1:
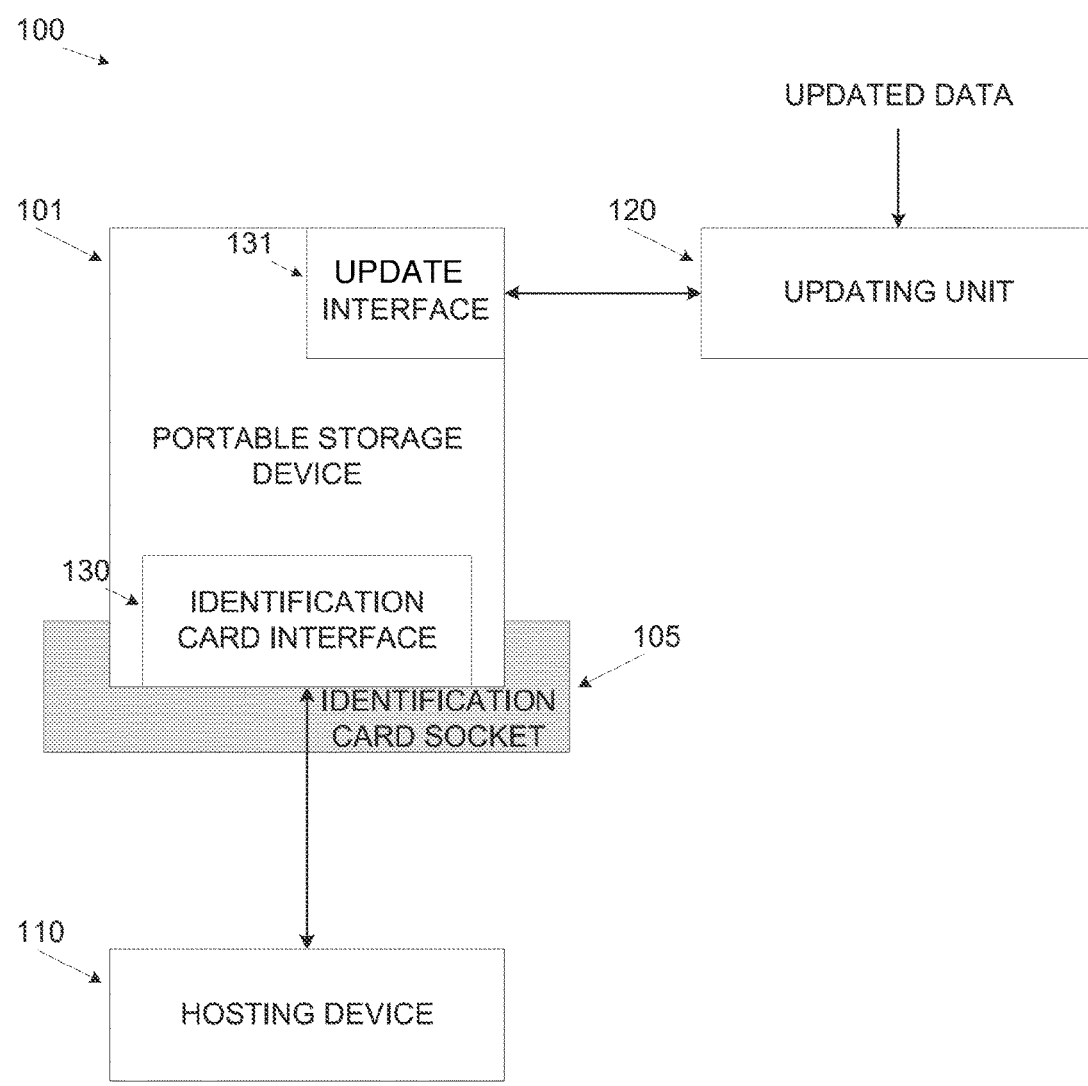
FIG. 1 is a schematic illustration of an exemplary system for remote update of a portable storage device which is plugged into an identification card socket, according to some embodiments of the present invention.

The present invention, in some embodiments thereof, relates to remote update of a portable storage device installed in an identification card socket and, more specifically, but not exclusively, to remote update of a portable storage device installed in an identification card socket while prolonging communication with a hosting device.

A portable storage device emulating an identification card may need to be updated with new data at the same time that it is being accessed by a hosting device, for example, a smartcard reader. The hosting device may try to access the new data while the new data is not yet available on the portable storage device. The portable storage device, which may be installed in an identification card socket, communicates with the hosting device through an identification card interface, for example, an identification card interface complying with the ISO/IEC 7816 specification. Updating the portable storage device may be done through an update interface which is independent of the identification card interface of the portable storage device. Updating the portable storage device with the new data may take consider-able time. In order to allow for the new data to be updated and stored in the portable storage device, communication with the hosting device over the identification card interface is prolonged. Prolonging communication with the hosting device is performed by delaying accesses of the hosting device to the new data so that the new data may be updated prior to it being accessed by the hosting device. It is desired to delay the hosting device accesses as long as possible to provide the update process the maximum possible time to complete the update of the portable storage device with the new data before the hosting device tries to access the new data.

Optionally, delaying the accesses of the hosting device to the portable storage device through the identification card interface is performed by responding to the hosting device with multiple consecutive no-operation procedure bytes sent prior to sending the hosting device a valid response. Any access made by the hosting device to the portable storage device triggers a timeout timer within the hosting device. The timeout timer is reset upon reception of an expected byte from the portable storage device, for example, but not limited to a procedure byte in accordance with ISO/IEC 7816. In case no expected byte is received from the portable storage before the timeout timer expires, the hosting device may consider the portable storage device as not available, invalid and/or damaged and may reset the interface. By responding with the no operation procedure byte, the timeout timer is reset and additional time is gained for the portable storage device to respond with a valid response. The portable storage device may acknowledge with one or more consecutive no operation procedure bytes to any access made by the hosting device, including accesses to data which is available in the portable storage device. By delaying accesses to data which is present on the portable storage device, the communication with the host device is further prolonged.

Optionally, additional delay in responding to the hosting device with data is utilized by manipulating a plurality of operation and/or timing parameters during the negotiation phase (ATR) between the identification card interface and the hosting device, for example, setting the communication frequency to minimum, setting a timeout counter to maximum value and/or inserting delays between consecutive byte transmissions.

While communication with the hosting device is being prolonged, the new data is written to the portable storage device through the update interface. After the new data is updated on the portable storage device the new data it may be made available to the hosting device through the identification card interface.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Reference is now made to FIG. 1 which is a schematic illustration of an exemplary system for remote update of a portable storage device which is plugged into an identification card socket, according to some embodiments of the present invention.

An exemplary system 100 includes a portable storage device 101 which is installed in an identification card socket 105, a hosting device 110 and an updating unit 120.

Communication between the hosting device 110 and the portable storage device 101 is done through the identification card socket 105 utilizing identification card communication protocol, for example, ISO/IEC 7816. When powered on and/or following reset, the hosting device 110, for example, a smartcard reader starts communicating with the portable storage device 101 through an identification card interface 130, for example an interface which complies with the ISO/IEC 7816 specification. The data required by the hosting device 110 may not be present on the portable storage device 101 and may need to be updated before being available to the hosting device 110. While the hosting device 110 accesses the portable storage device 101 through the identification card interface 130, the updating unit 120 updates the portable storage device 101 with new data through an update interface 131. The portable storage device 101 prolongs the communication with the hosting device 110 in order to allow the updating device 120 the maximum possible time to update the portable storage device 101 with the new data. After the new data is updated by the updating device 120 and stored in the portable storage device 101, the new data is made available to the hosting device 110.

Optionally, the updating unit 120 is integrated within the portable storage device 101.

Optionally, one or more portable storage devices 101, each installed in a respective identification card socket 105, operate in parallel with the hosting device 110 to extend the capabilities of the system, where only one of the portable storage devices 101 is active at any time.

Optionally, one or more portable storage devices 101 and one or more standard identification cards, each installed in a respective identification card socket 105, operate in parallel with the hosting device 110 to extend the capabilities of the system. Only one of the table storage devices 101 or standard identification cards is active at any time. This setup may be used to allow the hosting device 110, for example, a smartcard reader to access one or more standard identification cards during standard operation mode and access one or more portable storage device 101 during non-standard operation mode.

Standard operation mode refers to situations in which the data required by the hosting device 110 is pre-known and pre-loaded into a standard identification card. Non-standard operation mode refers to situations in which not all data is pre-loaded into the portable storage device 101 and new data needs to be updated while the portable storage device 101 is already installed in the identification card socket 105 and the hosting device accesses the portable storage device.

Figure 2:
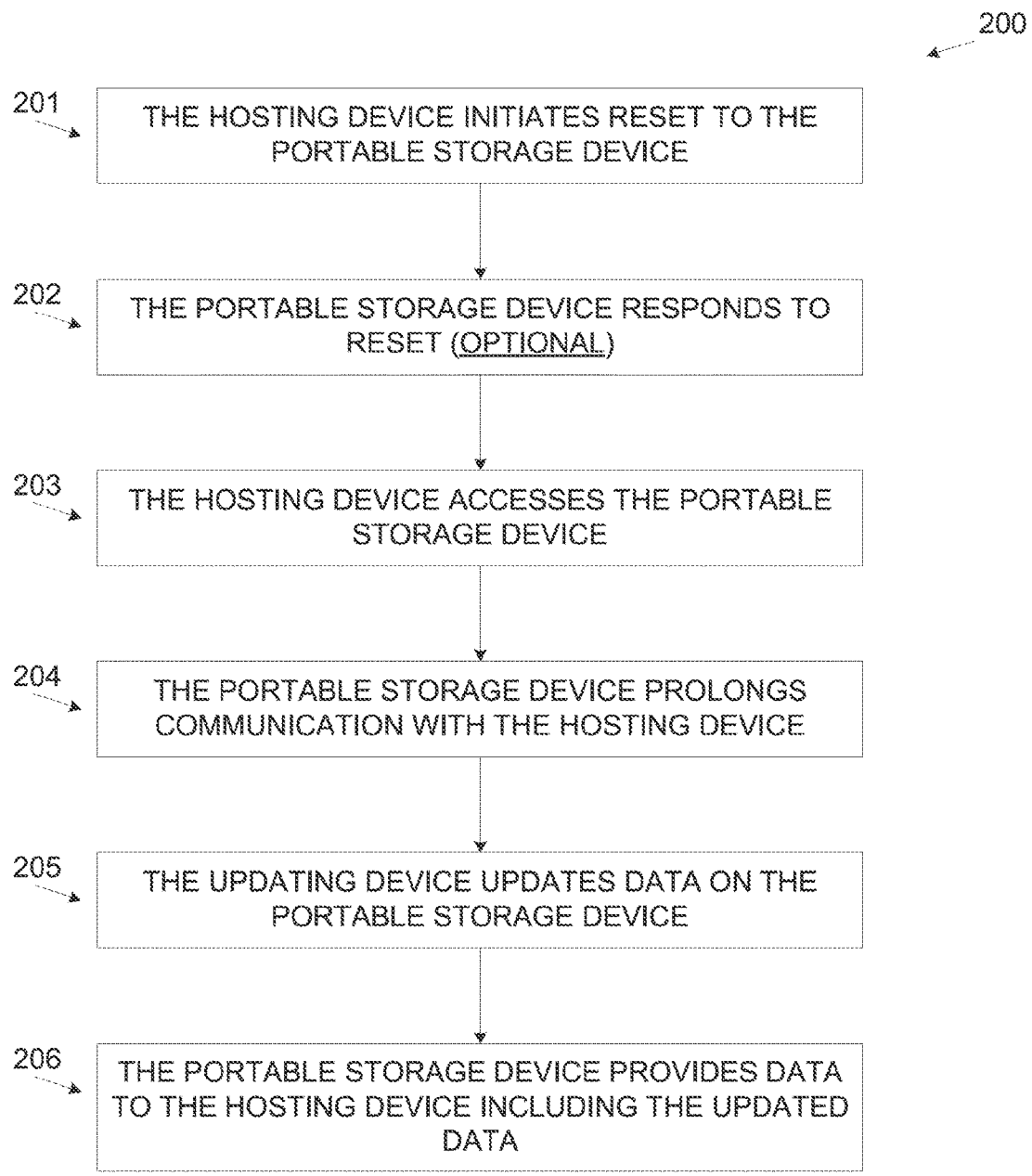
FIG. 2 is a flowchart of an exemplary process of remotely updating a portable storage device installed in an identification card socket, according to some embodiments of the present invention.

Reference is now made to FIG. 2 which is a flowchart of an exemplary process of remotely updating a portable storage device installed in an identification card socket, according to some embodiments of the present invention. An exemplary process 200 is followed to remotely update a portable storage device, such as the portable storage device 101 installed in an identification card socket, such as the identification card socket 105 while a hosting device, such as the hosting device 110 starts communicating with the portable storage device 101.

As shown at 201, the hosting device 110 resets the portable storage device 101, for example, by asserting the reset line of a of an identification card interface of the portable storage device 101, such as the identification card interface 130.

As shown at 202, the portable storage device 101 may respond to the reset cycle, for example, by transmitting an answer to reset (ATR) as defined by the ISO/IEC 7816 specification. The response to reset may include a plurality of fields which indicate the communication capabilities of the portable storage device 101 over the identification card interface 130, for example, as defined for the ATR by the ISO/IEC 7816 specification. The response to reset may not be utilized for interface specifications which do not specify such a response.

As shown at 203, following receipt of the ATR the hosting device 110 may start accessing the portable storage device 101 in order to retrieve and/or modify data.

Typically, initial accesses of the hosting device 110 may be done to data which is pre-loaded into the portable storage device and/or is available in the portable storage device 101. However, subsequent accesses of the hosting device 110 may be done to data that is not yet present on the portable storage device 101, i.e. not pre-loaded into the portable storage device 101 and needs to be updated in the portable storage device 101 through an update interface such as the update interface 131.

As shown at 204, the portable storage device 101 prolongs communication with the hosting device 110 by delaying the accesses of the hosting device 110 in order to allow additional time for the new data to be updated and stored in the portable storage device 101. The portable storage device 101 prolongs the communication with the hosting device 110 by acknowledging with one or more consecutive no operation procedure bytes to accesses made by the hosting device 110. Acknowledgement with the no operation procedure byte may reset the timeout timer within the hosting device. In order to delay the hosting device 110 as much as possible, the portable storage device 101 may acknowledge with one or more consecutive no operation procedure bytes to accesses made by the hosting device 110 to data which is pre-loaded and/or available in the portable storage device instead of immediately responding with the requested data.

Optionally, prolonging the communication with the hosting device 110 to the portable storage device 101 is achieved by setting one or more operation and/or timing parameters of the identification card interface 130 so as to reduce the communication rate with the hosting device 110. Setting the one or more operation and/or timing parameters may be done, for example, by setting the ATR fields with operation and/or timing parameters for the identification card interface 130, for example, according to the ISO/IEC 7816 specification. The ATR may include a plurality of communication characteristics to indicate the communication capabilities of the portable storage device 101 over the identification card interface 130. The communication characteristics may include, for example, operation frequency, operation mode, guard time and/or waiting time. The portable storage device 101 may set the fields in the ATR which correspond to the communication characteristics so as to slow down communication with the hosting device 110 in order to delay access to the portable storage device 101. Slowing down communication may be utilized through a plurality of settings of the ATR fields for indicating the capabilities of the portable storage device 101, for example, low frequency, long waiting time and/or long guard time. Low frequency may be set, for example, by setting the value of $TA_1[8:5]$ to b0000 (b stand for binary representation) to indicate a maximum frequency F is set to 4 MHz and/or a clock rate conversion integer Fi is set to 372. Long waiting time may be set by setting, for example, the value of $TC_2$ to hFF (h stand for hexadecimal representation) to set a waiting time integer WI to the maximum value. Long guard time may be set, for example, the value of $TC_1$ to hFF in order to set an extra guard time integer N to the maximum value and/or by setting the value of $TA_1[4:1]$ to b0001 to set a baud rate adjustment integer Di to the minimum value. Following reception of the ATR, the hosting device 110 may configure the communication flow over the first interface 130 to operate according to the parameters extracted from the ATR.

As shown at 205, while the hosting device 110 accesses the portable storage device 101 over the identification card interface 130 in order to get new data, the updating unit 102 updates the portable storage device 101 with the new data through the update interface 131. New data refers to data, for example identification and/or authentication data that is required by the hosting device 110 which may not yet be present in the portable storage device 101. The updating device 120 connects to the portable storage device 101 through the update interface 131.

Figure 3:
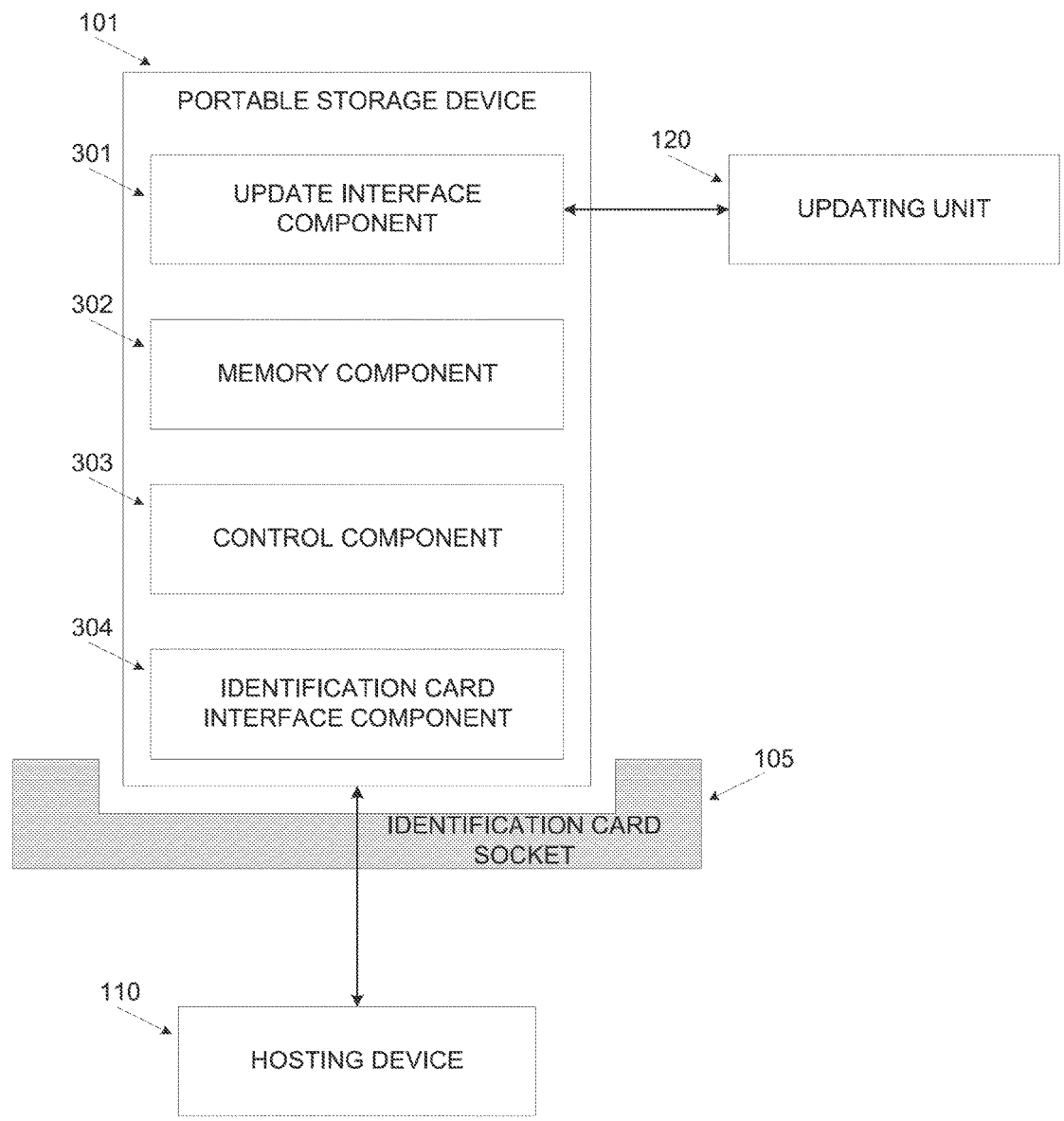
FIG. 3 is a schematic illustration of an exemplary portable storage device, according to some embodiments of the present invention.

Reference is now made to FIG. 3 which is a schematic illustration of an exemplar portable storage device, according to some embodiments of the present invention. An exemplary storage device, such as the portable storage device 101 is capable of being remotely updated while communicating with a host device, such as the hosting device 110. The portable storage device 101 may be installed in an identification card socket, such as the identification card socket 105. The portable storage device 101 may be remotely updated through an update interface component 301 connecting to an updating unit, such as the updating unit 120 which may transfer data to be updated in the portable storage device 101. The data which is pre-loaded and/or updated in the portable storage device 101 is stored in a memory component 302. An identification card interface component 304 communicates with the hosting device 110 through the identification card socket 105 and employs one or more communication protocols, for example ISO/IEC 7816. A control component 303 controls the operation of the components of the portable storage device 101 and/or the data flow through the portable storage device 101. The control component 303 may control the identification card interface component to acknowledge the hosting device 110 with the requested data and/or to acknowledge with the no operation procedure byte.

As shown at 206, after the new data is updated and stored in the portable storage device 101, the new data is made available to the hosting device 110.

Figure 4:
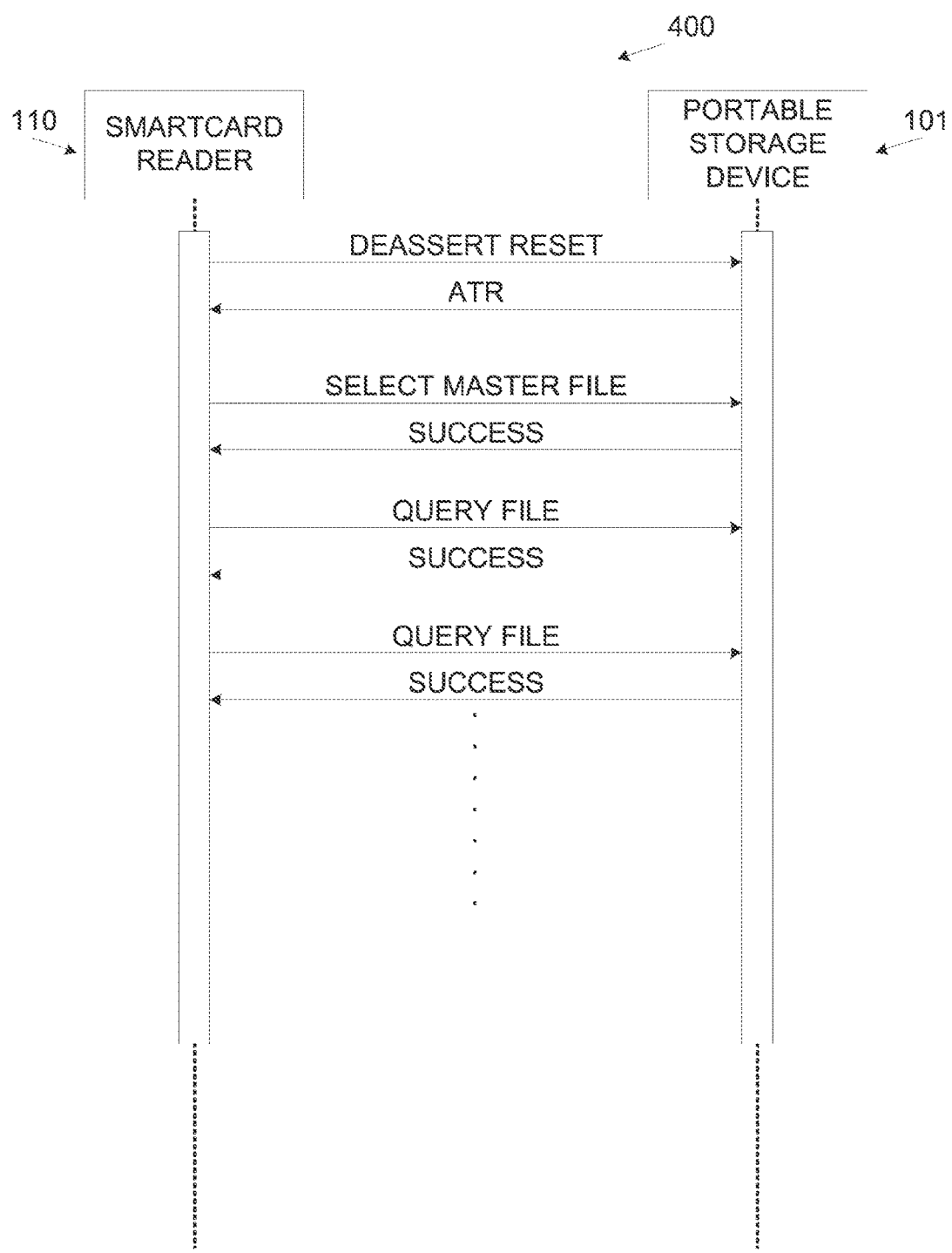
FIG. 4 is a schematic illustration of an exemplary typical communication sequence between a hosting device and a portable storage device installed in an identification card socket, according to some aspects of the present invention.

Reference is now made to FIG. 4 which is a schematic illustration of an exemplary typical communication sequence between a hosting device and a portable storage device installed in an identification card socket, according to some aspects of the present invention. As shown by a communication sequence 400 which employs a communication protocol, for example, per the ISO/IEC 7816 specification, a hosting device, such as the hosting device 110, communicates with a portable storage device, such as the portable storage device 101. The portable storage device 101 is installed in an identification card socket, such as the identification card socket 105 and communicates with the hosting device 110 through an identification card interface, such as the identification card interface 130. The hosting device 110 initiates a reset cycle responded by the portable storage device 101, for example, with an ATR. Following reception of the ATR the hosting device 110 may set the identification card interface 130 to operate according to the operation and/or timing parameters extracted from the ATR. After setting the identification card interface 130, the hosting device 110 may select, for example, the desired master file as defined by the ISO/IEC 7816 specification and proceeds with file queries. The communication sequence 400 describes a scenario in which all files are pre-loaded into the portable storage device 101 and all queries are acknowledged with the required information and success indication.

Figure 5:
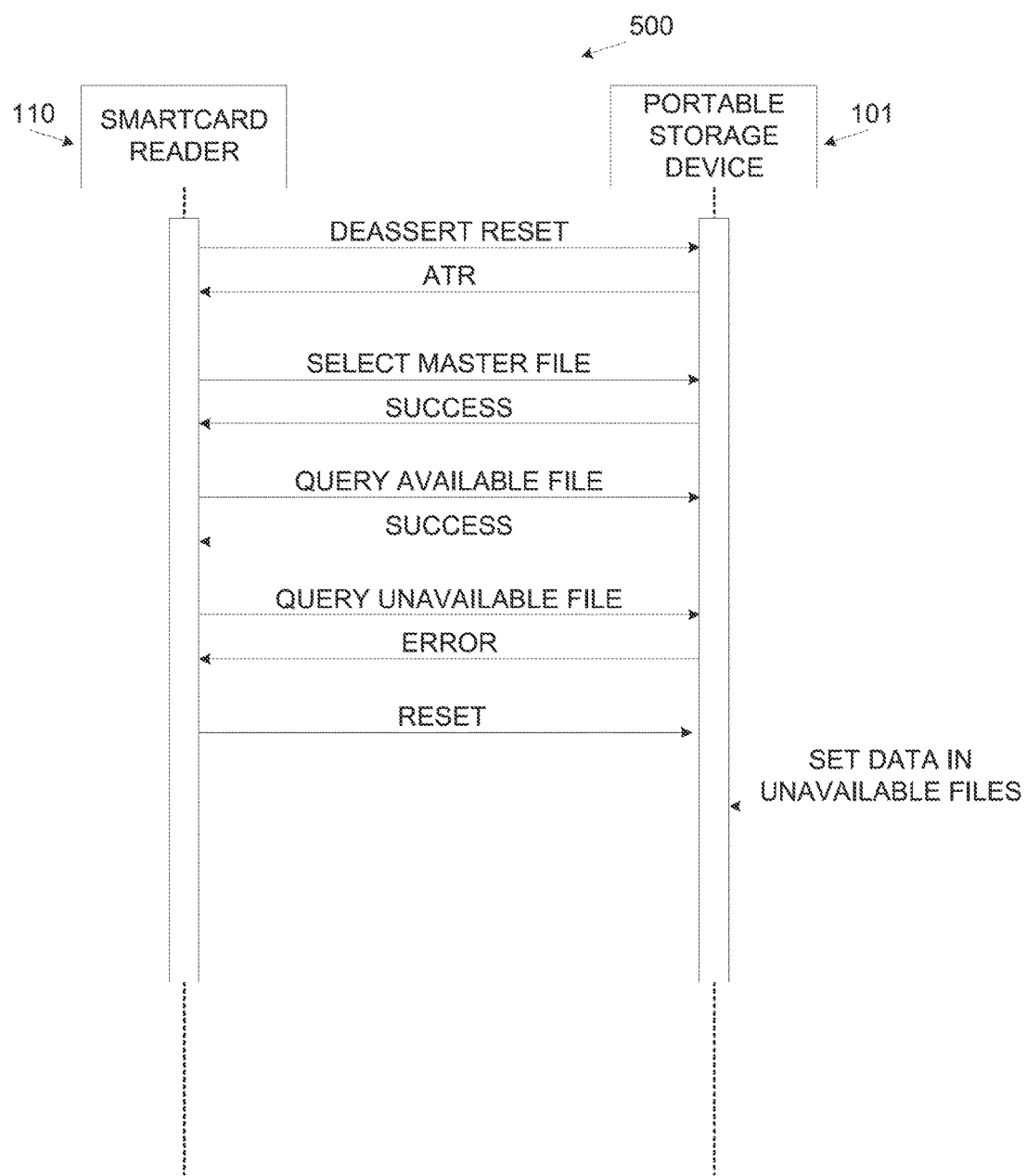
FIG. 5 is a schematic illustration of an exemplary communication sequence between a hosting device and portable storage device which concludes with an error due to file unavailability, according to some aspects of the present invention.

Reference is now made to FIG. 5 which is a schematic illustration of an exemplary communication sequence between a hosting device and a portable storage device which concludes with an error due to file unavailability, according to some aspects of the present invention. As shown by a communication sequence 500 which employs a communication protocol, for example, per the ISO/IEC 7816 specification, a hosting device, such as the hosting device 110, communicates with a portable storage device, such as the portable storage device 101. The portable storage device 101 is installed in an identification card socket, such as the identification card socket 105 and communicates with the hosting device 110 through an identification card interface, such as the identification card interface 130. The hosting device 110 initiates a reset cycle responded by the portable storage device 101, for example with an ATR. Following reception of the ATR, the hosting device 110 sets the identification card interface 130 to operate according to the operation and/or timing parameters extracted from the ATR.

After setting the identification card interface 130, the hosting device 110 may, for example, as defined in the ISO/IEC 7816 specification, select the master file which is typically pre-loaded in the portable storage device 101 and/or query for files which are typically pre-loaded and available in the portable storage device 101.

In parallel to the hosting device 110 accesses to the portable storage device 101, the portable storage device 101 may be updated with new data through another communication channel, such as, for example, the update interface 131. The new data may be required by the hosting device 110 but is not pre-loaded into the portable storage device 101. The hosting device 110 may first query for a file which is available in the portable storage device 101 and the cycle completes successfully with the requested data transferred to the hosting device 110. The hosting device 110 may then query for a file in which data is not available, i.e. the data was not pre-loaded in the portable storage device 101 prior to being installed in the identification card socket 105.

The cycle completes with an error indication or invalid data received from the portable storage device 101 due to data unavailability. Following the error response from the portable storage device 101, the hosting device 110 may reset the identification card interface 130 and may reset the portable storage device 101. As seen in the communication sequence 500, the hosting device 110 queries the portable storage device 101 for the files in which data is not yet available before they are fully updated in the portable storage device 101 and therefore the cycle is completed with an error.

Figure 6:
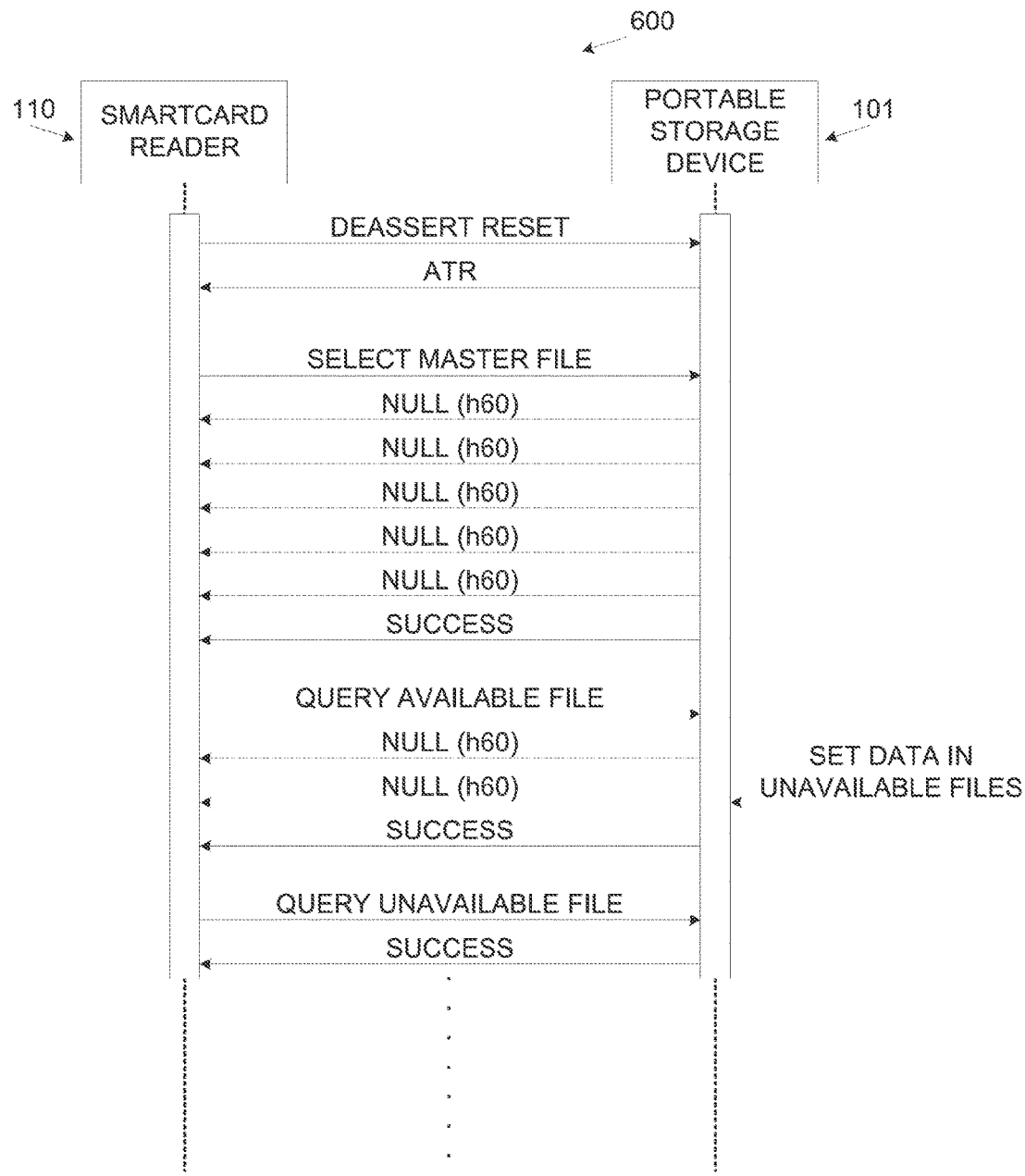
FIG. 6 is a schematic illustration of an exemplary communication sequence between a hosting device and portable storage device where communication is prolonged while the portable storage device is being updated with data that was not pre-loaded, according to some embodiments of the present invention.

Reference is now made to FIG. 6 which is a schematic illustration of an exemplary communication sequence between a hosting device and a portable storage device where communication is prolonged while the portable storage device is being updated with data that was not pre-loaded, according to some embodiments of the present invention. As shown by a communication sequence 600 which employs a communication protocol, for example, per the ISO/IEC 7816 specification, a hosting device, such as the hosting device 110, communicates with a portable storage device, such as the portable storage device 101. The portable storage device 101 is installed in an identification card socket, such as the identification card socket 105 and communicates with the hosting device 110 through an identification card interface, such as the identification card interface 130. The hosting device 110 initiates a reset cycle on the identification card interface 130 responded by the portable storage device 101, for example, with an ATR. Following reception of the ATR the hosting device 110 may set the identification card interface 130 to operate according to the operation and/or timing parameters extracted from the ATR. After setting the identification card interface 130, the hosting device 110 may, for example, select the master file as defined in the ISO/IEC 7816 specification. The portable storage device 101 prolongs communication with the hosting device 110 by acknowledging with the no operation procedure byte, for example, null transaction with value of h60 as specified by the ISO/IEC 7816 specification. Each no operation acknowledgement may reset a timeout timer within the hosting device which is triggered at the start of any access made by the hosting device 100 to the portable storage device 101. The master file select command may involve accesses to the file system requesting file system structure information and/or parameters. The file system ISO/IEC 7816 specification, is typically pre-loaded into the portable storage device 101 and may be responded immediately, however in order to provide time for the new data to be updated into the portable storage device 101, the response to the master file command is delayed. After responding with multiple consecutive null acknowledgments, the portable storage device 101 responds with success acknowledgment. The number of consecutive null acknowledgments generated by the portable storage device 101 is set so as not to exceed the maximum number of null acknowledgments allowed by the hosting device 110 before it resets and/or deactivates the identification card interface 130 with the portable storage device 101.

The maximum number of consecutive null acknowledgments allowed by the hosting device 110 may be different between different hosting devices 110 and may require some adjustments in the portable storage device 101 in order to comply with each of the hosting device 110.

In parallel to the hosting device 110 accesses to the portable storage device 101, the portable storage device 101 may be updated through another communication channel, such as, for example, the update interface 131 with new data in files that may be required by the hosting device 110 but is not pre-loaded into the portable storage device 101. Following the successful response to the select master file command, the hosting device 110 may initiate a query file command to the portable storage device 101. The first data files accessed by the hosting device may be pre-loaded in the portable storage device 101 and may be provided immediately to the hosting device 110. However, once again the cycle is delayed by responding with null responses in order to allow for additional time to update the portable storage device 101 with the new data. While the hosting device 110 queries for the available files, the new data is updated in the files which were not pre-loaded in advance in the portable storage device 101. When the hosting device 110 queries for the files which were initially unavailable (not pre-loaded in advance), the files are already updated with the new data and may be provided successfully to the hosting device 110.

In some embodiments, a smartcard emulation unit such as the smartcard emulation unit 201 may be a subscriber authentication unit adaptor as described in the PCT Publication WO2012140654, Methods and Systems for Routing Authentication and/or Identification Data of a Cellular Subscriber, which is incorporated herein by reference. The subscriber authentication unit adaptor as discussed in WO2012140654 may perform as a SIM emulation unit which may be installed in an identification card socket, such as a SIM socket and communicate with the hosting cellular device over an interface compliant, for example, with the ISO/IEC 7816 specification. The SIM emulation unit may be implemented through a portable storage device such as the portable storage device 101.

Figure 7:
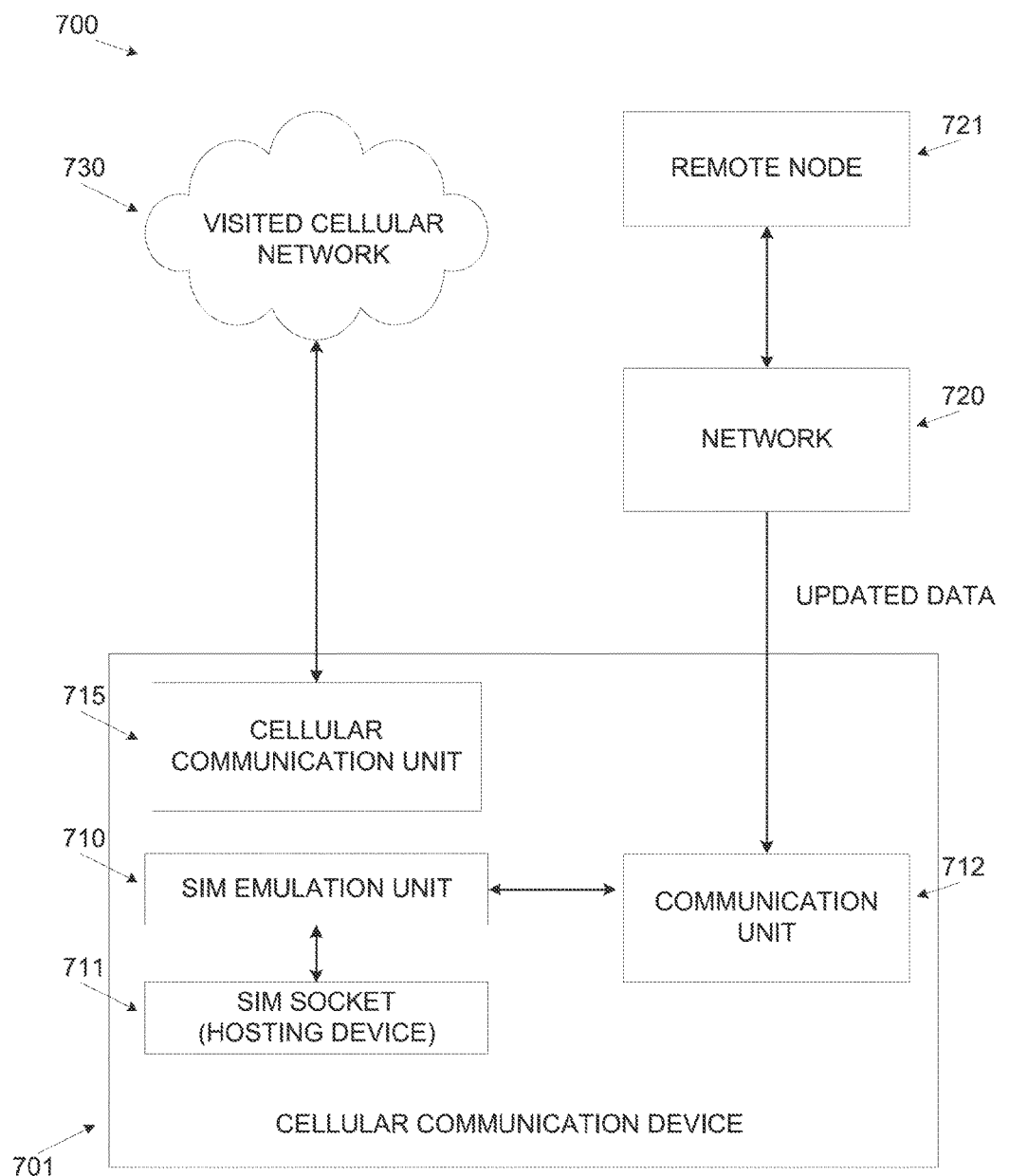
FIG. 7 which is a schematic illustration of an exemplary system for acquiring identification and/or authentication data of a subscriber to register a cellular communication device to a visiting network which employs remote update of a portable storage device, according to some embodiments of the present invention.

Reference is now made to FIG. 7 which is a schematic illustration of an exemplary system for acquiring identification and/or authentication data of a subscriber to register a cellular communication device to a visiting network which employs remote update of a portable storage device, according to some embodiments of the present invention. A system 700 describes a hosting cellular communication device 701 traveling away from the associated subscriber's home public mobile network (HPMN) coverage and roams into a visited network 730. Roaming rates charged for communication through a visited network 730 may be extremely high and in order to avoid the high costs it may be desirable to register the cellular communication device 701 as a local subscriber to the visited network 730.

In order to register the cellular communication device 701 as a local subscriber to the visited network 730, the cellular communication device 701 needs to be identified as a subscriber of the visited network 730. Subscription information may be stored, for example, in a SIM card and/or a SIM emulation unit 710 which is hosted by the cellular communication device 701. The contents of the SIM emulation unit 710 need to be updated to include local subscriber identification information before the cellular communication device 701 accesses the SIM emulation unit 710 to retrieve identification information and convey it to the visited network 730 through the cellular communication unit 715.

The cellular communication device 701 accesses the SIM emulation unit 710 through SIM socket 711 which is the hosting device for the SIM emulation unit 710. Following activation and/or reset, the SIM socket 711 starts accessing the SIM emulation unit 710. The SIM emulation unit 710 prolongs the accesses of the SIM socket 711 as described in the process 200. In parallel the SIM emulation unit 710 interacts with a remote node 721 over a network 720, for example internet and/or cellular through a communication unit 712, for example, wireless network adapter and/or a second cellular communication unit. The remote node 721, for example a server may provide identification information allowing the cellular communication device 701 to identify itself as a subscriber of the visited network 730. While the SIM socket 711 accesses the SIM emulation unit 710, the new identification data is being received and updated in the SIM emulation unit 710. Once the new identification data is available in the SIM emulation unit 710, it is made available to the SIM socket 711 which transfers it to the cellular communication device 701. The cellular communication device 701 may then identify itself as a subscriber of the visited network 730.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems, methods and computer programs will be developed and the scope of the term commerce information and price is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method of emulating a subscriber identification module (SIM), comprising:
    providing a portable storage device comprising an identification card interface component, an update interface component and a memory component configured to store data;
    providing a hosting device comprising an identification card socket; said portable storage device and said hosting device connected with each other;
    said portable storage device is installed in said identification card socket of said hosting device;
    sending by said hosting device a request for data associated with said emulated SIM from said portable storage device; and
    if a first part of said requested data associated with said emulated SIM is available and a second part of said requested data associated with said emulated SIM is unavailable in said memory component prior to said request for data,
    providing at least part of said first part of said available data to said hosting device through said identification card interface component;
    prolonging communication with said hosting device by acknowledging commands issued by said hosting device with at least one consecutive no operation procedure byte;
    updating said memory component with said second part of said requested data associated with said emulated SIM not yet available in said memory component through an updating device connected to said update interface component of said portable storage device; and
    providing said updated data to said hosting device through said identification card interface component.

2. The method of claim 1, wherein said identification card interface component complies with ISO/IEC 7816 specification.

3. The method of claim 1, wherein said at least one consecutive no operation procedure byte acknowledgement is utilized through a null response as specified by ISO/IEC 7816 specification.

4. The method of claim 2, further comprising setting operation frequency of said identification card interface component to low operation frequency by encoding accordingly a clock rate conversion integer, a baud rate adjustment integer and a maximum supported frequency in an answer to reset (ATR) response to said hosting device.

5. The method of claim 2, further comprising setting a waiting time (WT) over said identification card interface component to high WT value by encoding accordingly a waiting time integer (WI) in an answer to reset (ATR) response to said hosting device.

6. The method of claim 1, wherein number of repeats of acknowledgements of said no operation procedure byte on said identification card interface component is restricted to the maximum number of null responses allowed by said hosting device.

7. The method of claim 1, further comprising inserting maximum delay time between consecutive data transmissions over said identification card interface component when responding to said hosting device.

8. The method of claim 1, further comprising enabling at least two said portable storage devices to interface said hosting device where only one of said at least two portable storage devices is communicating with said hosting device at any time.

9. A portable storage device configured to emulate a subscriber identification module (SIM) or universal subscriber identification module (USIM), said portable storage device comprises:
- a memory component configured to store data;
- an update interface component configured to be connected to an updating device and to receive data requested by a hosting device; said requested data configured to be stored in said memory component;
- an identification card interface component configured to be connected to an identification card socket of said hosting device and to communicate with said hosting device to provide said hosting device with at least part of a first part of said requested data associated with said emulated SIM or USIM, said first part available in said memory component prior to said request for data;
- wherein a second part of said requested data is associated with said emulated SIM or USIM and unavailable in said memory component prior to said request for data; and
- a control component configured to control said memory component, said identification card interface component and said update interface component;
- said control component configured to control said identification card interface component to prolong communication with said hosting device by acknowledging said hosting device with at least one consecutive no operation procedure byte in order to allow said second part of said requested data associated with said emulated SIM or USIM and not yet available in said memory component to be updated in said memory component;
- wherein said updated data is provided to said hosting device through said identification card-interface component.

10. The portable storage device of claim 9, wherein said identification card interface component complies with ISO/IEC 7816 specification.

11. The method of claim 1, further comprising prior to said providing at least part of said first part of said available data, prolonging communication with said hosting device by acknowledging commands issued by said hosting device with at least one consecutive no operation procedure byte.

* * * * *